United States Patent
Takahashi et al.

(10) Patent No.: US 10,208,646 B2
(45) Date of Patent: Feb. 19, 2019

(54) RADIATOR RESERVOIR TANK AND RADIATOR STRUCTURE

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Yuki Takahashi, Okazaki (JP); Junichi Suematsu, Kariya (JP); Masashi Shibata, Nagoya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 90 days.

(21) Appl. No.: 14/944,704

(22) Filed: Nov. 18, 2015

(65) Prior Publication Data

US 2016/0146093 A1 May 26, 2016

(30) Foreign Application Priority Data

Nov. 20, 2014 (JP) ................... 2014-235541

(51) Int. Cl.
*F01P 3/18* (2006.01)
*F01P 11/02* (2006.01)
*F01P 5/04* (2006.01)

(52) U.S. Cl.
CPC .............. *F01P 11/029* (2013.01); *F01P 3/18* (2013.01); *F01P 11/0285* (2013.01); *F01P 2005/046* (2013.01); *F01P 2060/14* (2013.01)

(58) Field of Classification Search
CPC ..................................................... F01P 11/029
(Continued)

(56) References Cited

U.S. PATENT DOCUMENTS

| 4,175,616 A | * | 11/1979 | Pabst | ..................... F01P 11/029 |
|---|---|---|---|---|
| | | | | 123/41.51 |
| 4,739,730 A | * | 4/1988 | Jenz | ....................... F01P 11/029 |
| | | | | 123/41.27 |

(Continued)

FOREIGN PATENT DOCUMENTS

| JP | S61-97529 U | 6/1986 |
|---|---|---|
| JP | S61-105718 U | 7/1986 |

(Continued)

OTHER PUBLICATIONS

Apr. 17, 2018 Office Action issued in Japanese Patent Application No. 2014-235541.

(Continued)

*Primary Examiner* — Allen Flanigan
(74) *Attorney, Agent, or Firm* — Oliff PLC

(57) ABSTRACT

There is provided a radiator reservoir tank including: a tank body that is connected to a radiator and that includes an inlet section and an accumulation section for cooling water; a first rib that is disposed inside the tank body, and that extends out from a side wall at one side of facing side walls of the tank body toward another side, and that partitions between the inlet section and the accumulation section, and that is provided with a gap to the side wall at the other side; and a second rib that is provided further toward the inlet section side or the accumulation section side than the first rib, that extends out from the side wall at the other side toward the one side, and that is provided with a gap to the side wall at the one side.

6 Claims, 7 Drawing Sheets

(58) Field of Classification Search
USPC .................................. 165/104.32; 123/41.54
See application file for complete search history.

(56) References Cited

U.S. PATENT DOCUMENTS

| | | | | |
|---|---|---|---|---|
| 5,456,218 | A * | 10/1995 | Theorell | F01P 11/029 123/41.54 |
| 6,189,492 | B1 * | 2/2001 | Brown | B60S 1/50 123/41.49 |
| 6,216,646 | B1 * | 4/2001 | Smith | F01P 11/029 123/41.54 |
| 6,908,283 | B2 * | 6/2005 | Soofer | F01P 11/029 415/215.1 |
| 7,137,439 | B2 * | 11/2006 | Hoshino | F01P 11/029 165/149 |
| 7,383,795 | B2 * | 6/2008 | Lawrence | F01P 11/028 123/41.51 |
| 2002/0062651 | A1 * | 5/2002 | Klingler | B60H 1/3229 62/99 |
| 2005/0224021 | A1 * | 10/2005 | Kastell et al. | F01P 11/028 123/41.54 |
| 2009/0095761 | A1 * | 4/2009 | Wada | F01P 11/028 220/660 |

FOREIGN PATENT DOCUMENTS

| | | |
|---|---|---|
| JP | H04-129839 U | 11/1992 |
| JP | 2003-239746 A | 8/2003 |
| JP | 2003-286847 A | 10/2003 |
| JP | 2013-216226 A | 10/2013 |

OTHER PUBLICATIONS

Aug. 28, 2018 Office Action issued in Japanese Patent Application No. 2014-235541.

* cited by examiner

RADIATOR RESERVOIR TANK AND RADIATOR STRUCTURE

CROSS-REFERENCE TO RELATED APPLICATION

This application is based on and claims priority under 35 USC 119 from Japanese Patent Application, No. 2014-235541 filed on Nov. 20, 2014, the disclosure of which is incorporated by reference herein.

BACKGROUND

Technical Field

The present invention relates to a radiator reservoir tank and a radiator structure.

Related Art

Japanese Patent Application Laid-Open (JP-A) No. 2013-216226 describes a configuration in which a radiator and a condenser are supported by a support bracket. Note that a weakened portion is formed to a pin that couples together the support bracket and a vehicle frame. The pin breaks in a vehicle collision, releasing the radiator and the condenser from the supported state, and thereby preventing damage to the radiator or the condenser.

However, the radiator or the condenser sometimes contacts peripheral components when released from the supported state. In particular, a rib for preventing cooling water from overflowing spans across inside a reservoir tank (radiator reservoir tank) connected to the radiator, such that the reservoir tank has a higher strength (yield strength) and rigidity than other components. There is accordingly a possibility of peripheral components being affected in cases in which the reservoir tank contacts the peripheral components during a vehicle collision, or the like

SUMMARY

In consideration of the above circumstances, an object of the present invention is to obtain a radiator reservoir tank and a radiator structure capable of reducing the effect on peripheral components in a vehicle collision or the like, while suppressing cooling water from overflowing.

A radiator reservoir tank of a first aspect of the present invention includes: a tank body that is connected to a radiator and that includes an inlet section and an accumulation section for cooling water; a first rib that is disposed inside the tank body, and that extends out from a side wall at one side of facing side walls of the tank body toward another side, and that partitions between the inlet section and the accumulation section, and that is provided with a gap to the side wall at the other side; and a second rib that is provided further toward the inlet section side or the accumulation section side than the first rib, that extends out from the side wall at the other side toward the one side, and that is provided with a gap to the side wall at the one side.

The radiator reservoir tank of the first aspect of the present invention is provided with the tank body connected to the radiator, and the tank body includes the inlet section and the accumulation section for cooling water. Inside the tank body, the first rib extends out from the side wall at the one side of the side facing walls, and the second rib extends out from the side wall at the other side, further toward the inlet section side or the accumulation section side than the first rib. The inlet section and the accumulation section are partitioned from each other by the first rib and the second rib. This enables cooling water that has accumulated in the accumulation section to be suppressed from overflowing from the inlet section.

A gap is provided between the first rib and the side wall at the other side of the tank body, and a gap is also provided between the second rib and the side wall at the one side of the tank body. This enables the first rib and the second rib to be suppressed from acting as braces inside the tank body when the radiator reservoir tank contacts peripheral components in a vehicle collision, or the like. This also enables the first rib and the second rib to be suppressed from impinging on each other, and the tank body having a higher strength (yield strength) or rigidity than peripheral components.

A radiator structure of a second aspect of the present invention includes: a radiator that is attached to a vehicle front section; and the radiator reservoir tank of the first aspect that is disposed such that the accumulation section is connected to the radiator, the inlet section is positioned at a vehicle upper side, and the accumulation section is positioned at a vehicle lower side.

In the radiator structure of the second aspect of the present invention, when cooling water flows from the radiator into the accumulation section of the radiator reservoir tank, the cooling water can be suppressed from overflowing from the inlet section by the first rib and the second rib disposed inside the tank body. Moreover, when the radiator and the radiator reservoir tank are released from a supported state in a vehicle collision or the like, the tank body can be deformed without the first rib and the second rib acting as braces.

A radiator structure of a third aspect of the present invention is the second aspect, wherein the first rib and the second rib extend out along a vehicle front-rear direction from the respective side walls.

In the radiator structure of the third aspect of the present invention, even when the radiator reservoir tank moves toward the vehicle rear and contacts a peripheral component in a vehicle head-on collision, the tank body deforms so as to be squashed along the vehicle front-rear direction, enabling the effect on the peripheral component to be reduced.

A radiator structure of a fourth aspect of the present invention is the second aspect or the third aspect, wherein the first rib and the second rib slope toward the vehicle lower side on progression away from the inlet section.

In the radiator structure of the fourth aspect of the present invention, when cooling water is inserted through the inlet section at an upper portion of the tank body, the cooling water can effectively flow toward the accumulation section at the lower side via the first rib and the second rib. This enables cooling water to be suppressed from pooling in the vicinity of the inlet section and overflowing.

A radiator structure of a fifth aspect of the present invention is any one of the second aspect to the fourth aspect, wherein a gap is formed between the first rib and the second rib in plan view.

In the radiator structure of the fifth aspect of the present invention, some of the cooling water that has been introduced through the inlet section passes through the gap between the first rib and the second rib and accumulates in the accumulation section, thereby enabling the cooling water to be introduced efficiently.

A radiator structure of a sixth aspect of the present invention is any one of the second aspect to the fifth aspect, wherein plural of the first ribs and the second ribs are disposed alternately in the vehicle up-down direction.

In the radiator structure of the sixth aspect of the present invention, the plural first ribs and the plural second ribs partition between the inlet section and the accumulation section. This enables the cooling water to be suppressed from overflowing, compared to cases in which only one first rib and one second rib is formed.

As explained above, the radiator reservoir tank of the first aspect of the present invention and the radiator structure of the second aspect of the present invention have excellent advantageous effects of enabling the effect on peripheral components in a vehicle collision or the like to be reduced, while suppressing cooling water from overflowing.

The radiator structure of the third aspect of the present invention has an excellent advantageous effect of enabling the radiator reservoir tank to be suppressed from having an effect on peripheral components, particularly in a vehicle head-on collision.

The radiator structures of the fourth aspect and the fifth aspect of the present invention have an excellent advantageous effect of enabling cooling water to be introduced efficiently (enabling the ease with which cooling water is introduced to be improved).

The radiator structure of the sixth aspect of the present invention has an excellent advantageous effect of enabling cooling water to be effectively suppressed from overflowing.

BRIEF DESCRIPTION OF DRAWINGS

Exemplary embodiments of the present invention will be described in detail based on the following figures, wherein.

DETAILED DESCRIPTION

First Exemplary Embodiment

Explanation follows a radiator reservoir tank and a radiator structure according to a first exemplary embodiment, with reference to FIG. 1 to FIG. 6. Note that in each of the drawings, the arrow FR indicates the vehicle front side, the arrow LH indicates the vehicle left side, and the arrow UP indicates the vehicle upper side, as appropriate. In the below explanation, unless specifically stated otherwise, reference to the front-rear, up-down, and left-right directions refers to front-rear in the vehicle front-rear direction, up-down in the vehicle up-down direction, and left-right when facing the direction of progress.

Radiator Structure

Figure 1:
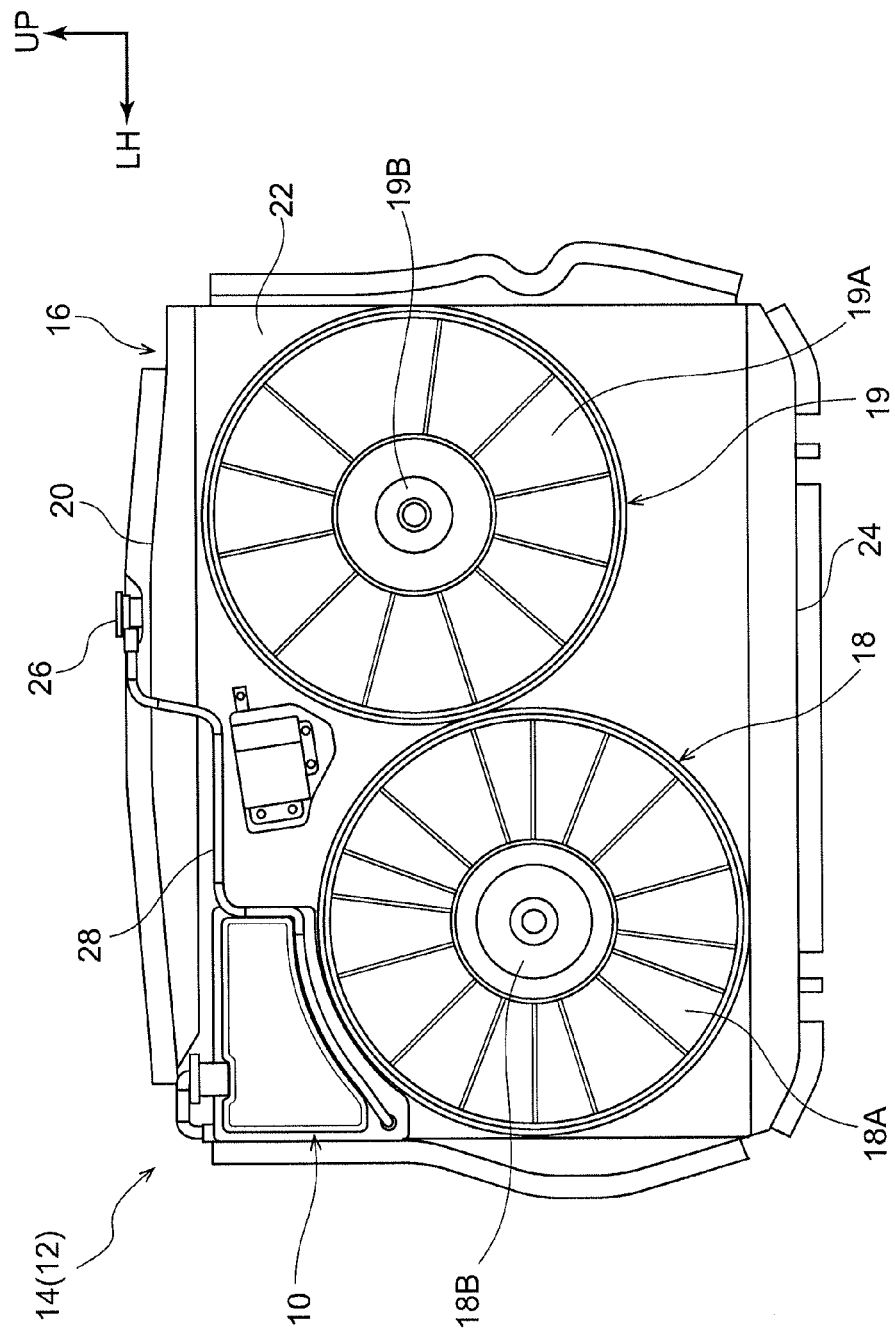
FIG. 1 is a back view illustrating a radiator structure according to a first exemplary embodiment, viewed from the vehicle rear side.

As illustrated in FIG. 1, the radiator structure including a radiator reservoir tank 10 (hereafter simply referred to as "reservoir tank 10") according to the present exemplary embodiment is disposed at a vehicle front section 14 of a vehicle (automobile) 12. The radiator structure is mainly configured including a radiator 16, a fan 18 and a fan 19 that introduce cooling airflow to the radiator 16, and the reservoir tank 10.

The radiator 16 is formed in a substantially rectangular shape viewed from the vehicle front or the vehicle rear, and is configured including an upper tank 20, a core section 22, and a lower tank 24. The radiator 16 is attached to a vehicle body by a radiator support, not illustrated in the drawings.

The upper tank 20 is positioned at an upper end portion of the radiator 16 and extends along the vehicle width direction, and cooling water is stored inside the upper tank 20. A radiator cap 26 is attached to an upper portion of the upper tank 20, and the radiator cap 26 and the reservoir tank 10, described later, are coupled together by a tube 28. A flow inlet, not illustrated in the drawings, is formed to the upper tank 20, and configuration is such that cooling water that has captured heat from an internal combustion engine and risen to a high temperature flows into the upper tank 20 through the flow inlet.

The core section 22 is provided below the upper tank 20. The core section 22 is provided with plural flattened tubes, not illustrated in the drawings, which are formed in straight lines running along the vehicle up-down direction and form flow paths for the cooling water. The tubes are disposed at intervals along the vehicle width direction. An upper end portion of each tube is connected to the upper tank 20, and a lower end portion of each tube is connected to the lower tank 24, described later. Corrugated fins, not illustrated in the drawings, are provided between adjacent tubes, and heat is transferred between the corrugated fins and the tubes. Heat is thereby exchanged between the cooling water flowing inside the tubes and air passing between the corrugated fins, cooling the cooling water.

The lower tank 24 is provided at a lower end portion of the core section 22. The lower tank 24 is positioned at a lower end portion of the radiator 16 and extends along the vehicle width direction. Cooling water that has flowed down from the upper tank 20 through the tubes is stored inside the lower tank 24. The lower tank 24 is provided with an outflow portion, not illustrated in the drawings, and the outflow portion is connected to a pipe. A water pump, not illustrated in the drawings, is driven such that cooling water inside the lower tank 24 is fed from the outflow portion and through the pipe toward the internal combustion engine, captures heat while passing through the internal combustion engine, and flows into an inflow portion of the upper tank 20. Configuration is thereby such that the internal combustion engine is maintained at a constant temperature by circulating cooling water in this manner.

A shroud, not illustrated in the drawings, is fixed to the vehicle rear side of the upper tank 20 and the lower tank 24, and the fan 18 and the fan 19 are attached to the shroud. Note that in the present exemplary embodiment, two fans, these being the fan 18 and the fan 19, are attached to the shroud; however, there is no particular limitation to the number or size of the fan 18 and the fan 19. The fan 18 is attached to the vehicle left side of the radiator 16, and includes rotary blades 18A and a motor 18B. External air can be introduced into the core section 22 of the radiator 16 as cooling airflow by driving the motor 18B to rotate the rotary blades 18A. The fan 19 is attached to the vehicle right side of the radiator 16, and includes rotary blades 19A and a motor 19B.

External air can be introduced into the core section 22 of the radiator 16 as cooling airflow by driving the motor 19B to rotate the rotary blades 19A.

The reservoir tank 10 is provided at an upper end portion and vehicle left side of the shroud. The reservoir tank 10 is disposed at the vehicle rear side of the radiator 16, and is thermally welded to the shroud. Note that the lower end portion of the reservoir tank 10 and the radiator cap 26 of the upper tank 20 are coupled together by the tube 28, and configuration is such that cooling water is capable of flowing between the reservoir tank 10 and the upper tank 20. Thus, when the temperature of the cooling water rises while the vehicle is running or the like, and the pressure inside the radiator 16 rises, a pressure valve, not illustrated in the drawings, provided to the radiator cap 26 opens, and cooling water flows out from the upper tank 20 toward the reservoir tank 10. When the temperature of the cooling water drops and the pressure falls, a negative pressure valve, not illustrated in the drawings, opens, and cooling water flows into the upper tank 20 from the reservoir tank 10.

Structure of Radiator Reservoir Tank

Figure 2:
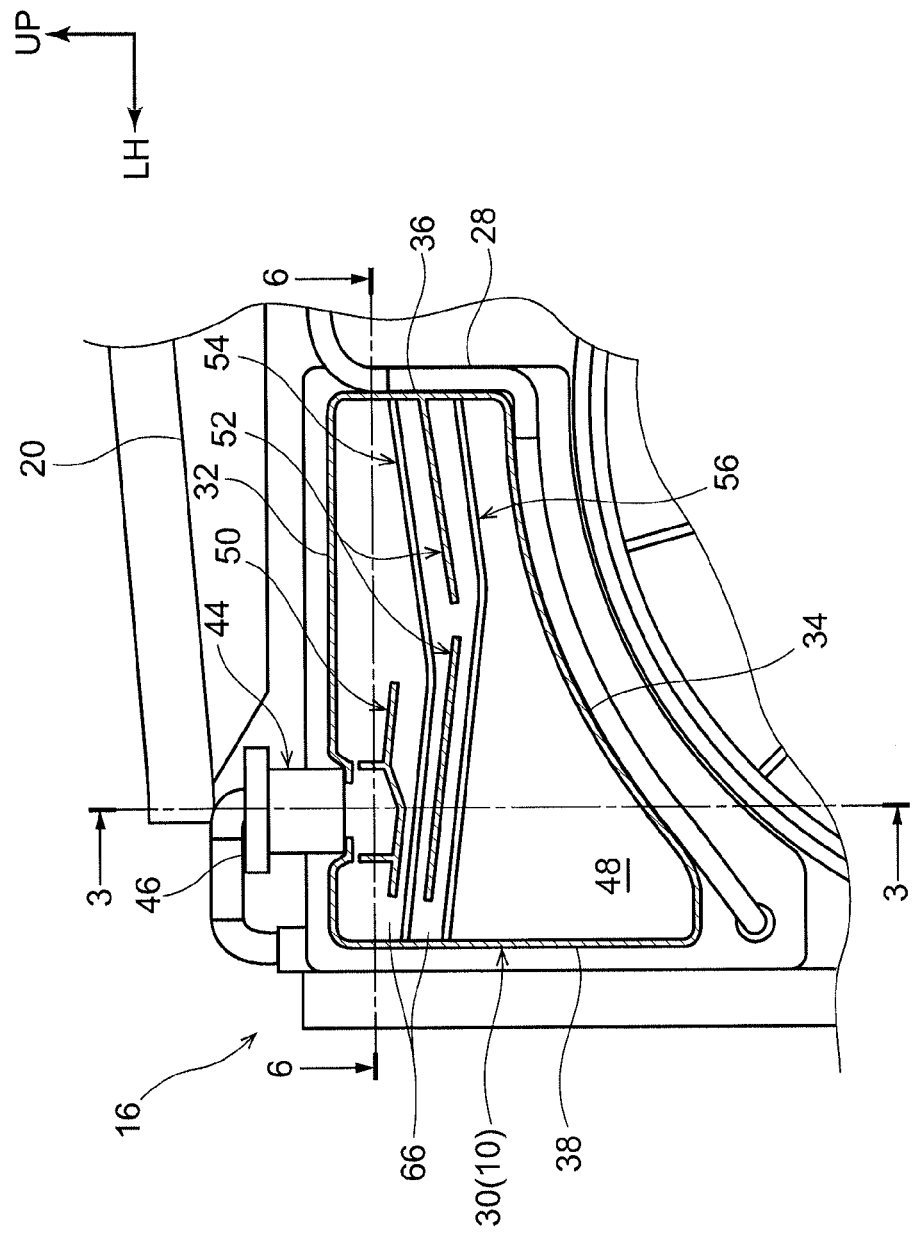
FIG. 2 is a back view illustrating a sectioned portion of a radiator reservoir tank according to the first exemplary embodiment.

Explanation follows regarding the structure of the reservoir tank 10. As illustrated in FIG. 2, the reservoir tank 10 is a resin member disposed at the vehicle rear side of the radiator 16, and includes a tank body 30 configuring an outer shell.

Figure 3:
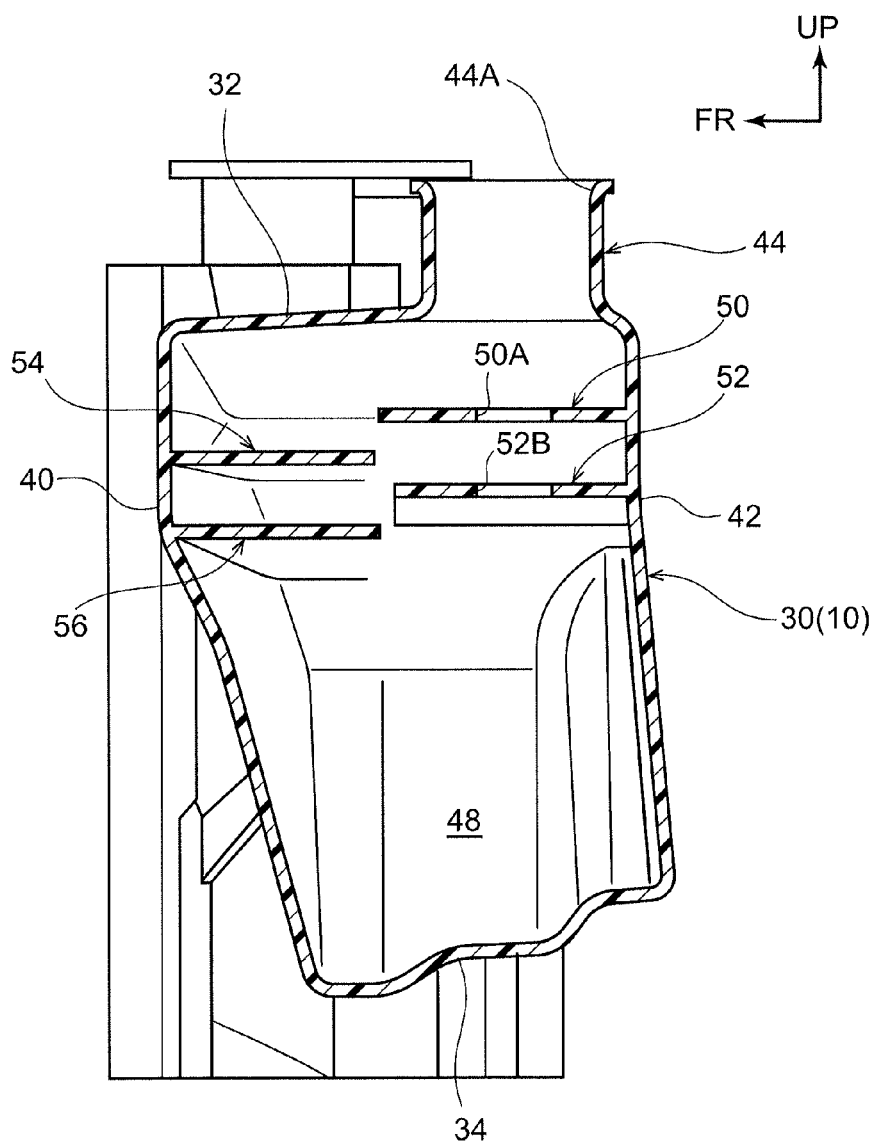
FIG. 3 is an enlarged cross-section sectioned along line 3-3 in FIG. 2.

As illustrated in FIG. 3, a cross-section profile of the tank body 30 vertically sectioned along the vehicle front-rear direction forms a substantially rectangular shaped cross-section. As illustrated in FIG. 2 and FIG. 3, the tank body 30 is configured including an upper wall 32, a lower wall 34, a right wall 36, a left wall 38, a front wall 40, and a rear wall 42. The upper wall 32 configures an upper face of the tank body 30, and a cooling water inlet section 44 is provided at the vehicle left side of the upper wall 32.

As illustrated in FIG. 3, the inlet section 44 is formed in a substantially tube shape, places the inside and outside of the tank body 30 in communication with each other, and includes an inlet port 44A open toward the vehicle upper side. As illustrated in FIG. 2, a cap 46 is attached to the inlet port 44A, and the cap 46 is removed to enable the cooling water to be introduced into the reservoir tank 10.

The lower wall 34 configures a lower face of the tank body 30, and is formed in a substantially circular arc shape curving toward the vehicle upper side on progression from the vehicle left side toward the vehicle right side. The tube 28 is installed running along the lower wall 34 at the vehicle lower side of the lower wall 34.

The right wall 36 configures a side face at the vehicle right side of the tank body 30. The left wall 38 configures a side face at the vehicle left side of the tank body 30, and is formed with a longer length along the vehicle up-down direction than the right wall 36. Note that an upper side first rib 50 and a lower side first rib 52, each serving as a first rib, and an upper side second rib 54 and a lower side second rib 56, each serving as a second rib, are disposed between the right wall 36 and the left wall 38. A space inside the tank body 30 is partitioned by the four ribs into the inlet section 44 side at the vehicle upper side, and an accumulation section 48 side at the vehicle lower side. The four ribs are described in detail later.

The accumulation section 48 provided at the vehicle lower side of the tank body 30 is a space in which cooling water accumulates, and the tube 28 is connected to the accumulation section 48. Cooling water flows between the accumulation section 48 and the upper tank 20 of the radiator 16.

As illustrated in FIG. 3, the front wall 40 configures a side face at the vehicle front side of the tank body 30, and the rear wall 42 configures a side face at the vehicle rear side of the tank body 30. Note that the front wall 40 and the rear wall 42 correspond to "facing side walls of the tank body" of the present invention. The upper side first rib 50 and the lower side first rib 52 extend out from the rear wall 42 forming the side wall at one side toward the front wall 40 forming the side wall at another side, and the upper side second rib 54 and the lower side second rib 56 extend out from the front wall 40 toward the rear wall 42.

Figure 4:
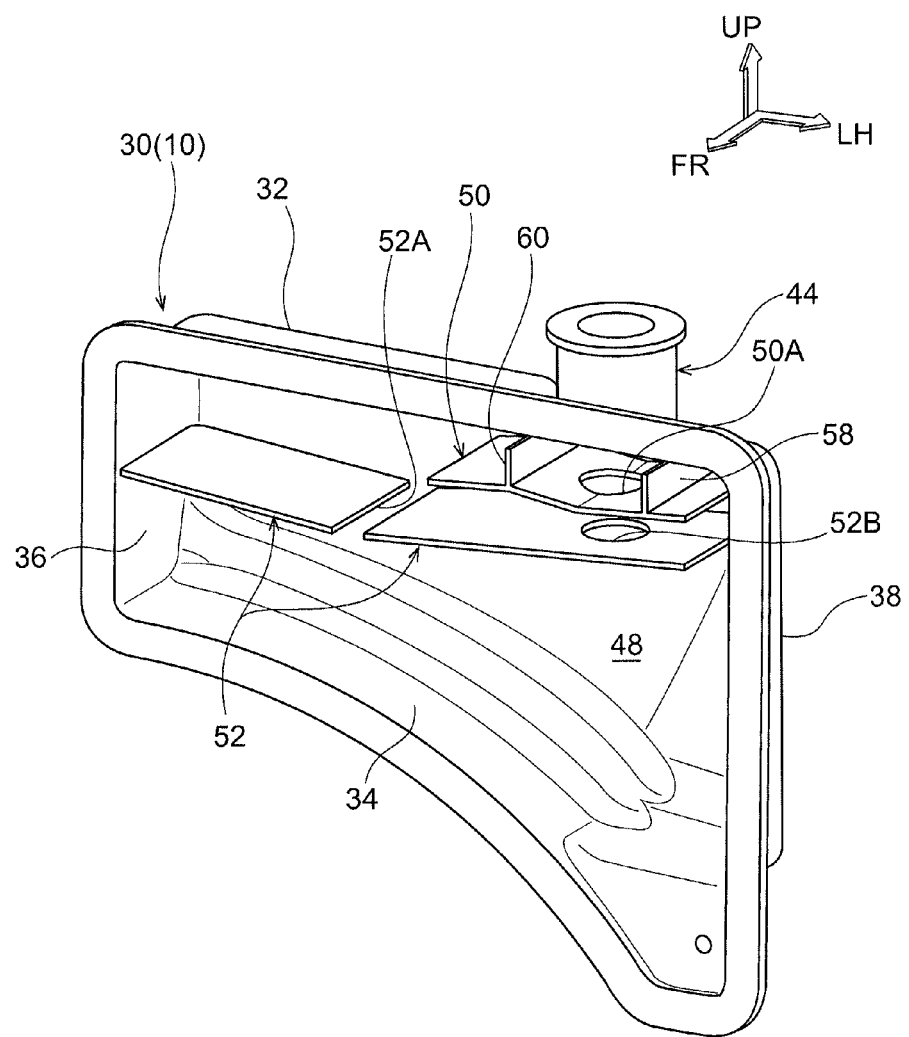
FIG. 4 is a perspective view illustrating a vehicle rear side half of a radiator reservoir tank according to the first exemplary embodiment.

As illustrated in FIG. 4, the upper side first rib 50 is disposed below the inlet portion 44, and extends along the vehicle width direction from the vicinity of the left wall 38 as far as a vehicle width direction center portion of the tank body 30. A circular hole 50A that pierces through the upper side first rib 50 in the plate thickness direction is formed at a location of the upper side first rib 50 directly below the inlet port 44A. A guide wall 58 and a guide wall 60 extend out from the upper side first rib 50 toward the vehicle upper side.

The guide wall 58 and the guide wall 60 are provided with an interval in the vehicle width direction and the circular hole 50A interposed therebetween. A gap is provided between the upper side first rib 50 and the guide wall 60, and the upper wall 32 of the tank body 30. Note that, viewed from the vehicle front, the upper side first rib 50 slopes toward the vehicle lower side on progression from a vehicle left side end portion toward the circular hole 50A, and slopes toward the vehicle upper side on progression from the circular hole 50A toward the guide wall 60. Namely, both sides of the circular hole 50A form a substantially V-shaped cross-section. The upper side first rib 50 slopes toward the vehicle lower side on progression from the guide wall 60 toward the vehicle right side (on progression away from the inlet section 44).

Since the upper side first rib 50 is configured as described above, cooling water introduced through the inlet port 44A is easily guided to the circular hole 50A. Configuration is such that, in cases in which a large volume of cooling water has been introduced, cooling water spills over the guide wall 58 and the guide wall 60 and flows toward the vehicle lower side from both vehicle width direction sides.

The lower side first rib 52 is disposed at the vehicle lower side of the upper side first rib 50. The lower side first rib 52 is formed with substantially the same width along the vehicle front-rear direction as the upper side first rib 50. The lower side first rib 52 extends from the vicinity of the left wall 38 of the tank body 30 as far as the right wall 36, and a vehicle right side end portion is linked to the right wall 36. A slit 52A is formed in a vehicle width direction center portion of the lower side first rib 52, and the lower side first rib 52 is divided in the vehicle width direction by the slit 52A. The lower side first rib 52 further to the vehicle right side than the slit 52A slopes toward the vehicle lower side on progression toward the slit 52A, and the lower side first rib 52 further to the vehicle left side than the slit 52A slopes toward the vehicle lower side on progression toward the slit 52A (on progression away from the inlet section 44). A circular hole 52B, formed coaxially to the circular hole 50A of the upper side first rib 50, is formed at a location of the lower side first rib 52 directly below the inlet port 44A. Configuration is thereby such that at least some of the cooling water introduced through the inlet port 44A passes through the circular hole 50A and the circular hole 52B, and accumulates in the accumulation section 48.

Figure 5:
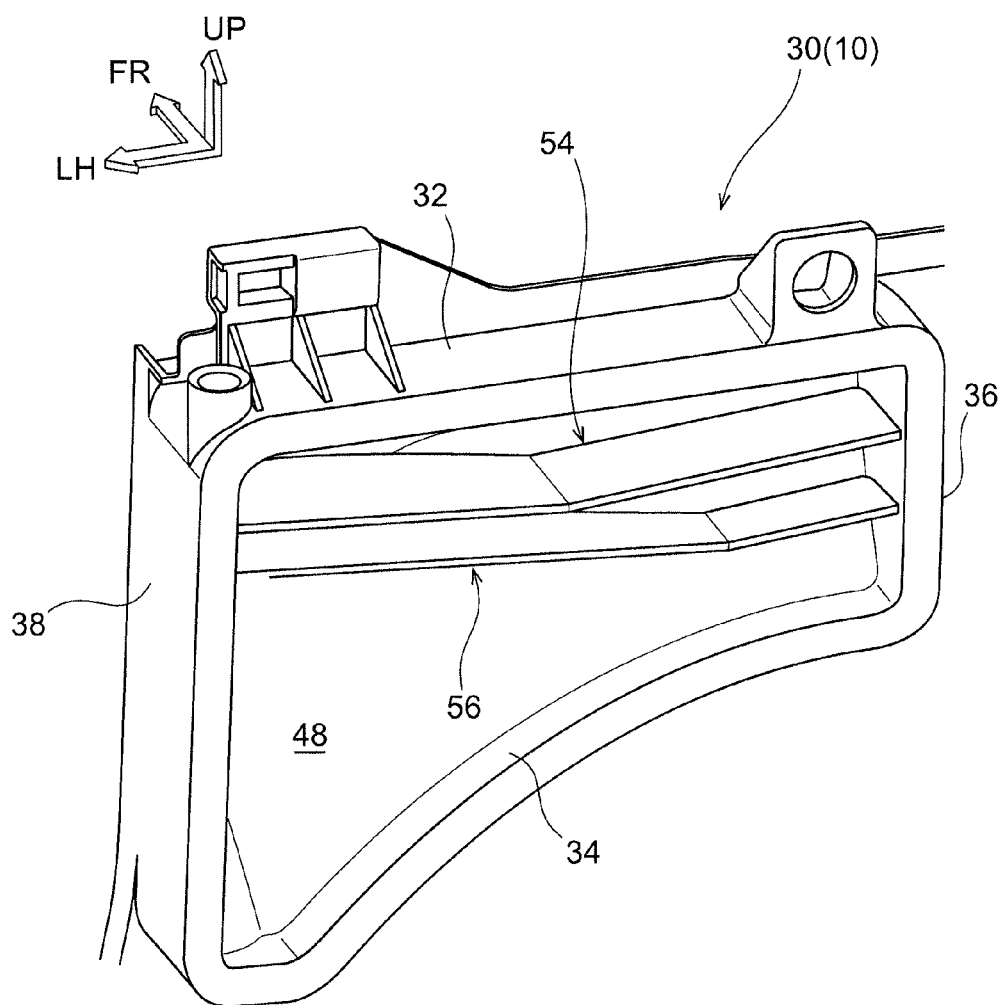
FIG. 5 is a perspective view illustrating a vehicle front side half of a radiator reservoir tank according to the first exemplary embodiment.

As illustrated in FIG. 3, the upper side second rib 54 extends out from the front wall 40 toward the rear wall 42 at a height that is between the upper side first rib 50 and the lower side first rib 52. As illustrated in FIG. 5, the upper side second rib 54 spans across between the left wall 38 and the right wall 36. The upper side second rib 54 slopes toward the vehicle lower side on progression from a vehicle width direction right side end portion thereof toward the vehicle width direction center portion of the tank body 30. The upper side second rib 54 also slopes toward the vehicle lower side on progression from a vehicle width direction left side end portion thereof toward the vehicle width direction center portion of the tank body 30. Thus, as illustrated in FIG. 2, the upper side second rib 54 is formed in a substantially V-shape viewed from the vehicle front-rear direction, and the vehicle width direction left side of the upper side second rib 54 slopes toward the vehicle lower side on progression away from the inlet section 44.

As illustrated in FIG. 5, the lower side second rib 56 is disposed at the vehicle lower side of the upper side second rib 54. The lower side second rib 56 is formed with substantially the same width along the vehicle front-rear direction as the upper side second rib 54. Similarly to the upper side second rib 54, the lower side second rib 56 spans across between the left wall 38 and the right wall 36. The lower side second rib 56 is formed in a substantially V-shape viewed from the vehicle front-rear direction, and the vehicle width direction left side of the lower side second rib 56 slopes further toward the vehicle width direction right side than that of the upper side second rib 54.

Note that, as illustrated in FIG. 3, the upper side first rib 50 and the lower side first rib 52 extending out from the rear wall 42 do not reach as far as the front wall 40, and a gap is provided between these ribs and the front wall 40. The upper side second rib 54 and the lower side second rib 56 extending out from the front wall 40 do not reach as far as the rear wall 42, and a gap is provided between both these ribs and the rear wall 42. The upper side first rib 50 and the lower side first rib 52 extending out from the rear wall 42, and upper side second rib 54 and the lower side second rib 56 extending out from the front wall 40, are disposed alternately to each other in the vehicle up-down direction. Specifically the upper side first rib 50, the upper side second rib 54, the lower side first rib 52, and the lower side second rib 56 are disposed in sequence from the vehicle upper side.

Figure 6:
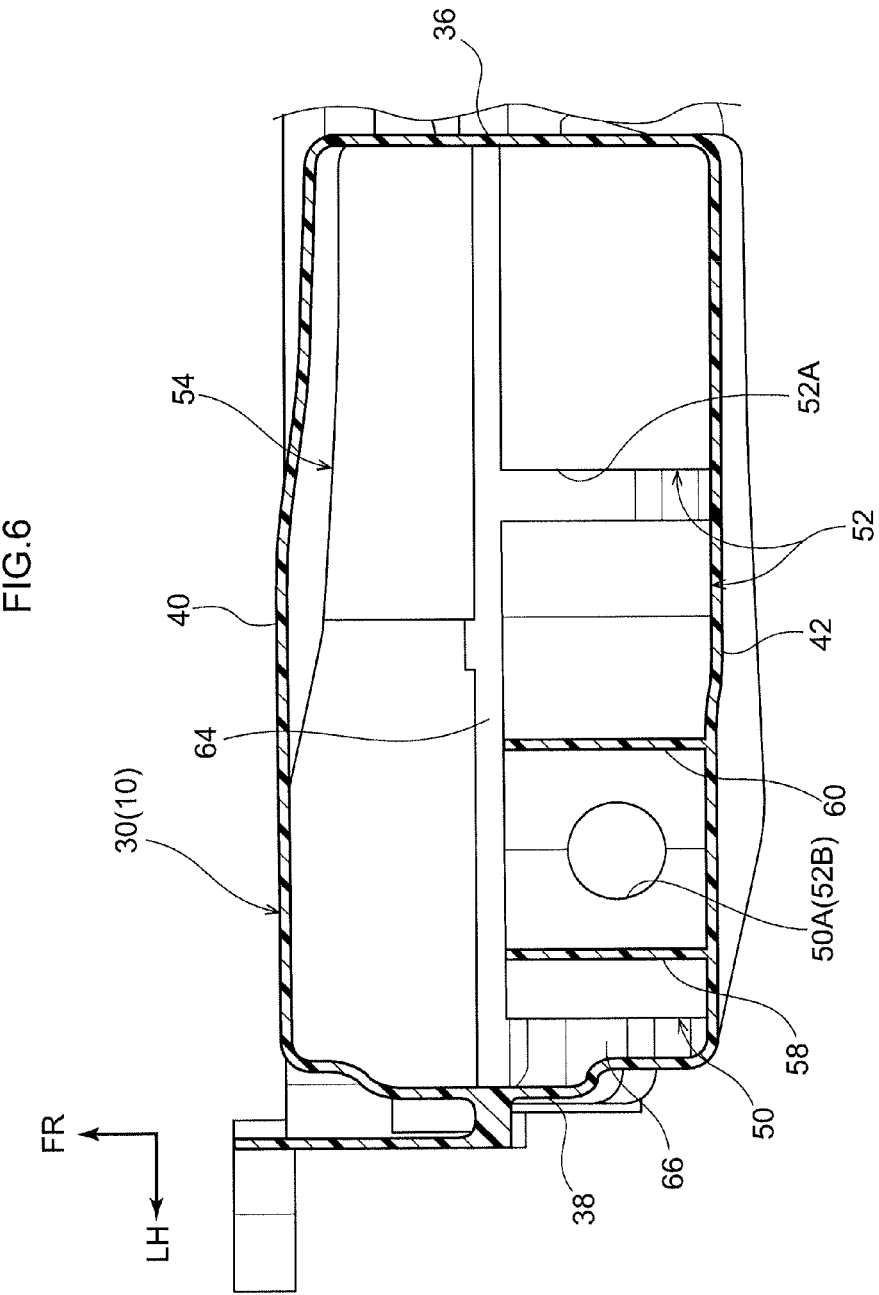
FIG. 6 is an enlarged cross-section sectioned along line 6-6 in FIG. 2.

As illustrated in FIG. 6, a gap 64 is formed between the upper side first rib 50 and the upper side second rib 54 in plan view. A gap is similarly formed between the lower side first rib 52 and the lower side second rib 56, such that the upper side first rib 50 and the lower side first rib 52 are formed so as not to be superimposed on (not to overlap) the upper side second rib 54 and the lower side second rib 56 in plan view.

As illustrated in FIG. 2 and FIG. 6, a gap 66 is formed between the upper side first rib 50 and the lower side first rib 52, and the left wall 38. Thus the upper side first rib 50, and a portion of the lower side first rib 52 further to the vehicle width direction left side than the slit 52A, are only linked to the rear wall 42, and have a substantially cantilevered form.

Operation and Advantageous Effects

Explanation follows regarding operation and advantageous effects of the present exemplary embodiment.

As illustrated in FIG. 2, in the radiator structure including the reservoir tank 10 of the present exemplary embodiment, the inlet section 44 at the vehicle upper side and the accumulation section 48 at the vehicle lower side are partitioned from each other by the upper side first rib 50, the lower side first rib 52, the upper side second rib 54, and the lower side second rib 56. Thus, when cooling water flows into the reservoir tank 10 from the radiator 16, cooling water that has accumulated in the accumulation section 48 can be suppressed from overflowing from the inlet section 44. In particular, in the present exemplary embodiment, the plural first ribs (the upper side first rib 50 and the lower side first rib 52) and the plural second ribs (the upper side second rib 54 and the lower side second rib 56) are disposed alternately to each other in the vehicle up-down direction, and partition between the inlet section 44 and the accumulation section 48. This enables cooling water to be more effectively suppressed from overflowing while the vehicle 12 is running, compared to cases in which only one first rib and one second rib is formed.

In the present exemplary embodiment, the four ribs (the upper side first rib 50, the lower side first rib 52, the upper side second rib 54, and the lower side second rib 56) slope toward the vehicle lower side on progression away from the inlet section 44. Thus, when cooling water is introduced through the inlet port 44A of the inlet section 44, the cooling water can effectively flow toward the accumulation section 48 at the vehicle lower side via the first ribs and the second ribs. Namely, cooling water can be suppressed from pooling in the vicinity of the inlet section 44, and the ease with which cooling water is introduced can be improved.

In the present exemplary embodiment, the gap 64 is formed between the first ribs (the upper side first rib 50 and the lower side first rib 52) and the second ribs (the upper side second rib 54 and the lower side second rib 56) in plan view. Thus some of the cooling water flowing through the inlet port 44A passes through the gap 64 and is accumulated in the accumulation section 48, thereby enabling the cooling water to be introduced efficiently. Namely, the ease with which cooling water is introduced can be improved.

Explanation follows regarding a case in which the vehicle 12 including the radiator structure according to the present exemplary embodiment is involved in a head-on collision. When the radiator 16 and the reservoir tank 10 are released from a supported state due to a head-on collision of the vehicle 12, the radiator 16 and the reservoir tank 10 sometimes contact peripheral components disposed at the vehicle front side or the vehicle rear side. When this occurs, the reservoir tank 10 deforms so as to be squashed in the vehicle front-rear direction. Note that, as illustrated in FIG. 3, a gap is provided between the front wall 40, and the upper side first rib 50 and the lower side first rib 52, and a gap is also provided between the rear wall 42, and the upper side second rib 54 and the lower side second rib 56. Thus the ribs do not act as braces until the upper side first rib 50 and the lower side first rib 52 contact the front wall 40, or until the upper side second rib 54 and the lower side second rib 56 contact the rear wall 42. Namely, the tank body 30 can be effectively deformed, and the tank body 30 can be suppressed from having a higher strength (yield strength) or rigidity than peripheral components. This enables the effect on peripheral components to be reduced.

Since the first ribs (the upper side first rib 50 and the lower side first rib 52) and the second ribs (the upper side second rib 54 and the lower side second rib 56) are disposed alternately to each other in the vehicle up-down direction, the first ribs and the second ribs can be suppressed from impinging on each other and acting as braces. As described above, the effect can be reduced on peripheral components in a collision of the vehicle 12 or the like, while suppressing cooling water from overflowing while running.

As illustrated in FIG. 2 and FIG. 6, in the present exemplary embodiment, the gap 66 is formed between the upper side first rib 50 and the lower side first rib 52, and the left wall 38, thereby enabling the strength of the tank body 30 to be effectively reduced. However, since the upper side second rib 54 and the lower side second rib 56 span across between the right wall 36 and the left wall 38, a uniform rigidity can be secured, thereby enabling the tank body 30 to be suppressed from deforming easily during normal running or the like.

In the present exemplary embodiment, the reservoir tank 10 is formed with a substantially rectangular shaped cross-section; however, the present invention is not limited thereto. For example, the present invention may be applied to a substantially circular tube shaped reservoir tank. In such cases, configuration may be such that first ribs extend out from the vehicle rear side (one side) of a side wall of the circular tube shaped reservoir tank toward the vehicle front side (another side), and second ribs extend out from the vehicle front side of the side wall toward the vehicle rear side.

In the present exemplary embodiment, the first ribs (the upper side first rib 50 and the lower side first rib 52) extend out from the rear wall 42 of the tank body 30 toward the front wall 40, and the second ribs (the upper side second rib 54 and the lower side second rib 56) extend out from the front wall 40 toward the rear wall 42; however, the present invention is not limited thereto. For example, first ribs may extend out from the left wall 38 of the tank body 30 toward the right wall 36, and second ribs may extend out from the right wall 36 toward the left wall 38.

There is no particular limitation to the number or shape of the upper side first rib 50, the lower side first rib 52, the upper side second rib 54, or the lower side second rib 56. For example, a configuration may be applied in which only the upper side first rib 50 and the upper side second rib 54 are provided, or conversely, a configuration may be applied in which three or more of both the first ribs and the second ribs are provided. The upper side first rib 50 illustrated in FIG. 4 may be shaped extending out further toward the vehicle right side. The slit 52A formed to the lower side first rib 52 may be made narrower in the vehicle front-rear direction, and portions at the vehicle right side and the vehicle left side of the lower side first rib 52 may be shaped linked together.

In the present exemplary embodiment, a gap is provided between the upper side first rib 50 and the lower side first rib 52, and the left wall 38; however, configuration is not limited thereto, and the upper side first rib 50 and the lower side first rib 52 may extend out as far as the left wall 38. Moreover, a gap may be provided between the upper side second rib 54 or the lower side second rib 56, and at least one of the right wall 36 or the left wall 38, according to the strength (yield strength) and rigidity required of the tank body 30.

In the present exemplary embodiment, the first ribs and the second ribs slope toward the vehicle lower side on progression away from the inlet section 44; however, the present invention is not limited thereto. For example, at least some of the four ribs may be disposed substantially horizontally along the vehicle width direction.

As illustrated in FIG. 3, in the present exemplary embodiment, the first ribs and the second ribs do not slope in the vehicle front-rear direction; however, the present invention is not limited thereto. For example, the upper side first rib 50 and the lower side first rib 52 may slope toward the vehicle lower side on progression from the vehicle rear toward the vehicle front. Similarly, the upper side second rib 54 and the lower side second rib 56 may slope toward the vehicle lower side on progression from the vehicle front toward the vehicle rear.

Second Exemplary Embodiment

Figure 7:
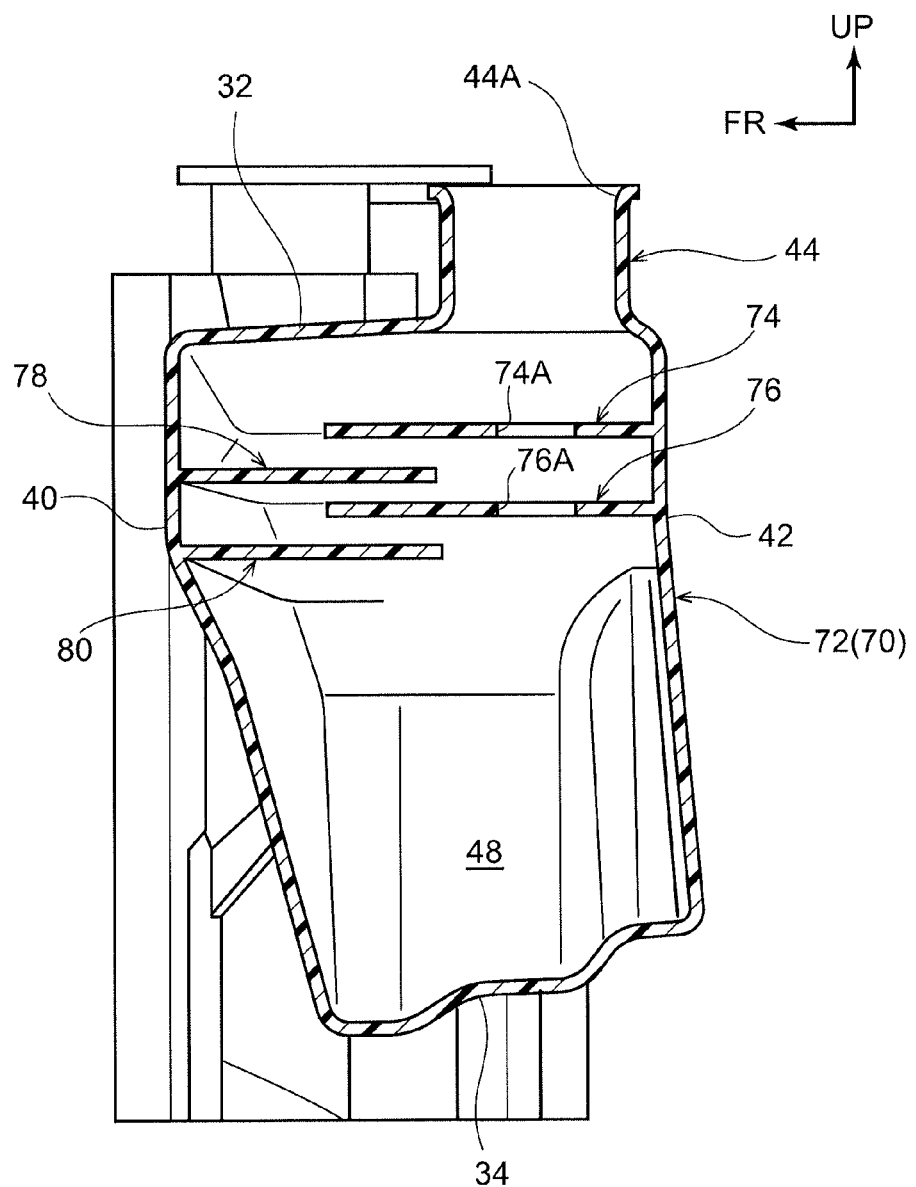
FIG. 7 is an enlarged cross-section corresponding to FIG. 3, illustrating an internal structure of a radiator reservoir tank according to a second exemplary embodiment.

Explanation follows regarding a radiator reservoir tank and a radiator structure according to a second exemplary embodiment. As illustrated in FIG. 7, a feature of the present exemplary embodiment is that first ribs and second ribs overlap each other along the vehicle front-rear direction. Note that similar structures to the first exemplary embodiment are appended with the same reference numerals, and explanation thereof is omitted as appropriate.

The radiator structure of the present exemplary embodiment is configured similarly to FIG. 1, and, as illustrated in FIG. 7, a tank body 72 of a radiator reservoir tank 70 (hereafter simply referred to as "reservoir tank 70") configuring the radiator structure is formed with a substantially rectangular shaped cross-section.

Plural ribs are disposed inside the tank body 72. Specifically, an upper side first rib 74 and a lower side first rib 76 extend out from the rear wall 42 toward the front wall 40 of the tank body 72, and an upper side second rib 78 and a lower side second rib 80 extend out from the front wall 40 toward the rear wall 42 of the tank body 72. A circular hole 74A and a circular hole 76A are respectively formed in the upper side first rib 74 and the lower side first rib 76, directly below the inlet section 44.

Note that the upper side second rib 78 and the lower side second rib 80 are formed with substantially the same length along the vehicle front-rear direction as the second ribs of the first exemplary embodiment (the upper side second rib 54 and the lower side second rib 56). However, the upper side first rib 74 and the lower side first rib 76 extend out further toward the vehicle front side than the first ribs of the first exemplary embodiment (the upper side first rib 50 and the lower side first rib 52). The first ribs and the second ribs are thereby formed so as to overlap each other along the vehicle front-rear direction.

A gap is provided between the upper side first rib 74 and the lower side first rib 76, and the front wall 40 of the tank body 72, and a gap is also provided between the upper side second rib 78 and the lower side second rib 80, and the rear wall 42 of the tank body 72.

Operation and Advantageous Effects

Explanation follows regarding operation and advantageous effects of the present exemplary embodiment.

In the present exemplary embodiment, the first ribs (the upper side first rib 74 and the lower side first rib 76) and the second ribs (the upper side second rib 78 and the lower side second rib 80) overlap each other along the vehicle front-rear direction, thereby enabling overflowing to be even more effectively suppressed than in the reservoir tank 10 of the first exemplary embodiment. Namely, in the present exemplary embodiment, there is no gap provided between the first ribs and the second ribs in plan view, such that cooling water that has accumulated in the accumulation section 48 does not overflow through such a gap. This enables the cooling water to be effectively suppressed from overflowing while running.

Note that in the present exemplary embodiment, the upper side first rib 74 and the lower side first rib 76 extend out further to the vehicle front side than in the first exemplary embodiment; however, configuration is not limited thereto. For example, the vehicle width direction length of the upper side second rib 78 and the lower side second rib 80 may extend out further toward the vehicle rear side than the upper side second rib 54 and the lower side second rib 56 of the first exemplary embodiment, without changing the vehicle width direction length of the upper side first rib 74 and the lower side first rib 76 compared to the first exemplary embodiment. Such a case also enables similar advantageous effects to be obtained by overlapping the first ribs and the second ribs with each other along the vehicle front-rear direction.

Radiator reservoir tanks and radiator structures according to the first exemplary embodiment and the second exemplary embodiment of the present invention have been explained above. These exemplary embodiments may be combined and employed as appropriate, and obviously various modifications may be implemented within a range not departing from the spirit of the present invention. For example, the lower side first rib 52 in FIG. 3 may be changed to the lower side first rib 76 according to the second exemplary embodiment. In such a case, a structure can be obtained in which ease with which cooling water is introduced is not impaired, while more effectively suppressing cooling water that has accumulated in the accumulation section 48 from overflowing.

What is claimed is:

1. A radiator structure comprising:
a radiator that is attached to a vehicle front section; and
a radiator reservoir tank comprising:
   a tank body that is connected to a radiator and that comprises an inlet section and an accumulation section for cooling water;
   a first rib that is disposed inside the tank body, and that extends out from a side wall at one side of facing side walls of the tank body toward another side, and that partitions between the inlet section and the accumulation section, and that is provided with a gap to the side wall at the other side; and
   a second rib that is provided further toward the inlet section side or the accumulation section side than the first rib, that extends out from the side wall at the other side toward the one side, and that is provided with a gap to the side wall at the one side,
wherein the radiator reservoir tank is disposed such that the accumulation section is connected to the radiator, the inlet section is positioned at a vehicle upper side, and the accumulation section is positioned at a vehicle lower side, and
wherein the first rib and the second rib extend out along a vehicle front-rear direction from the respective side walls.

2. The radiator structure of claim 1, wherein a gap is formed between the first rib and the second rib in plan view.

3. The radiator structure of claim 1, wherein
a plurality of first ribs and second ribs are disposed alternately in the vehicle up-down direction.

4. A radiator structure comprising:
a radiator that is attached to a vehicle front section; and
a radiator reservoir tank comprising:
   a tank body that is connected to a radiator and that comprises an inlet section and an accumulation section for cooling water;
   a first rib that is disposed inside the tank body, and that extends out from a side wall at one side of facing side walls of the tank body toward another side, and that partitions between the inlet section and the accumulation section, and that is provided with a gap to the side wall at the other side; and
   a second rib that is provided further toward the inlet section side or the accumulation section side than the first rib, that extends out from the side wall at the other side toward the one side, and that is provided with a gap to the side wall at the one side,
wherein the radiator reservoir tank is disposed such that the accumulation section is connected to the radiator, the inlet section is positioned at a vehicle upper side, and the accumulation section is positioned at a vehicle lower side, and
wherein the first rib and the second rib slope toward the vehicle lower side on progression away from the inlet section.

5. The radiator structure of claim 4, wherein a gap is formed between the first rib and the second rib in plan view.

6. The radiator structure of claim 4, wherein a plurality of first ribs and second ribs are disposed alternately in the vehicle up-down direction.

* * * * *